(12) United States Patent
Toth et al.

(10) Patent No.: US 7,832,100 B2
(45) Date of Patent: Nov. 16, 2010

(54) SEAL ASSEMBLY AND METHOD OF MANUFACTURING THE SAME

(75) Inventors: David M. Toth, Brighton, MI (US); Frederick Hatch, Ann Arbor, MI (US)

(73) Assignee: Federal-Mogul World Wide Inc., Southfield, MI (US)

( * ) Notice: Subject to any disclaimer, the term of this patent is extended or adjusted under 35 U.S.C. 154(b) by 290 days.

(21) Appl. No.: 12/179,743

(22) Filed: Jul. 25, 2008

(65) Prior Publication Data
US 2008/0271301 A1 Nov. 6, 2008

Related U.S. Application Data

(62) Division of application No. 10/920,689, filed on Aug. 18, 2004, now Pat. No. 7,419,165.

(51) Int. Cl.
*F16J 15/32* (2006.01)
(52) U.S. Cl. ................ 29/888.3; 29/456; 29/469.5; 277/569; 277/549; 277/559
(58) Field of Classification Search ............... 29/888.3, 29/446, 456, 469.5, 505; 277/559, 569, 570, 277/572, 400, 402
See application file for complete search history.

(56) References Cited

U.S. PATENT DOCUMENTS

| | | | |
|---|---|---|---|
| 3,341,265 A | 9/1967 | Paterson | |
| 3,490,775 A | 1/1970 | Henshaw | |
| 3,527,512 A | 9/1970 | Miller | |
| 3,682,488 A | 8/1972 | Matsushima | |
| 3,706,459 A | 12/1972 | Frenzel et al. | |
| 4,216,973 A | 8/1980 | Kessinger, Jr. | |
| 4,239,245 A | 12/1980 | Giglio et al. | |
| 4,311,346 A | 1/1982 | Danner | |
| 4,448,426 A | 5/1984 | Jackowski et al. | |
| 4,470,605 A | 9/1984 | Deuring | |
| 4,504,067 A | 3/1985 | Cather | |
| 4,613,143 A * | 9/1986 | Butler | 277/569 |

(Continued)

OTHER PUBLICATIONS

Quadrant Engineering Plastic Products, Product and Applications Guide, Copyright 2001Quadrant Engineering Plastic Products, Inc., p. 40.

*Primary Examiner*—David P Bryant
*Assistant Examiner*—Christopher Besler
(74) *Attorney, Agent, or Firm*—Robert L. Stearns; Dickinson Wright, PLLC

(57) ABSTRACT

A seal assembly and method for the manufacture thereof is provided. The seal assembly provides a dynamic fluid seal between a housing having a bore and a shaft having an outer running surface rotating within the bore. The seal assembly comprises a rigid carrier for supporting the seal assembly within the bore of the housing. A flexible member is mounted to the rigid carrier. The flexible member is formed from an elastomeric material that allows the flexible member to flex during use. A sealing element is retained by the flexible member about the outer running surface. The sealing element is formed from a non-polytetrafluoroethylene bearing grade plastic material having a hardness relatively greater than a hardness of the elastomeric material of the flexible member. The sealing element moves with the flexible member as the flexible member flexes. The sealing element extends along the outer running surface in a plurality of helically wound convolutions.

7 Claims, 4 Drawing Sheets

U.S. PATENT DOCUMENTS

| | | |
|---|---|---|
| 4,750,847 A | 6/1988 | Boyd |
| 4,969,653 A | 11/1990 | Breen |
| 5,015,001 A | 5/1991 | Jay |
| 5,098,112 A | 3/1992 | Petrak |
| 5,183,269 A | 2/1993 | Black et al. |
| 5,201,529 A | 4/1993 | Heinzen |
| 5,292,199 A | 3/1994 | Hosback et al. |
| 5,553,866 A | 9/1996 | Heinzen |
| 4,448,426 A | 9/1997 | Jackowski et al. |
| 5,687,972 A | 11/1997 | Petrak |
| 5,794,940 A | 8/1998 | Brueggmann |
| 5,975,538 A | 11/1999 | Krause et al. |
| 5,979,904 A | 11/1999 | Balsells |
| 6,004,039 A | 12/1999 | Yabe et al. |
| 6,073,933 A | 6/2000 | Johnston |
| 6,105,968 A | 8/2000 | Yeh et al. |
| 6,145,842 A | 11/2000 | Zellers et al. |
| 6,206,380 B1 | 3/2001 | Miyazaki |
| 6,315,296 B1 | 11/2001 | Oldenburg |
| 6,345,825 B1 | 2/2002 | Guth et al. |
| 6,357,751 B1 | 3/2002 | Rentschler |
| 6,357,757 B1 | 3/2002 | Hibbler et al. |
| 6,367,810 B1 | 4/2002 | Hatch |
| 2003/0015843 A1 | 1/2003 | Smith et al. |

* cited by examiner

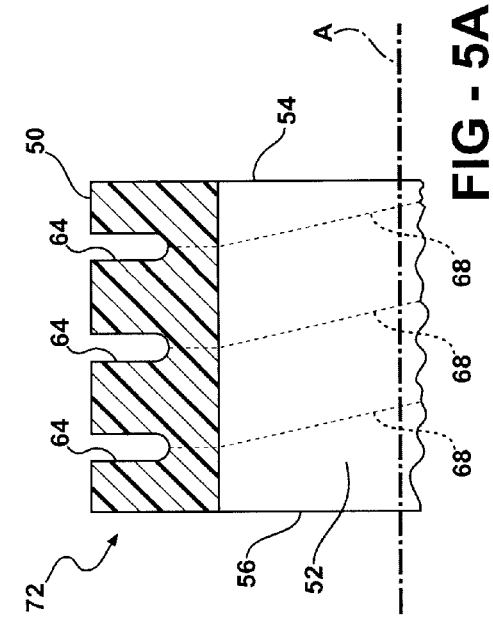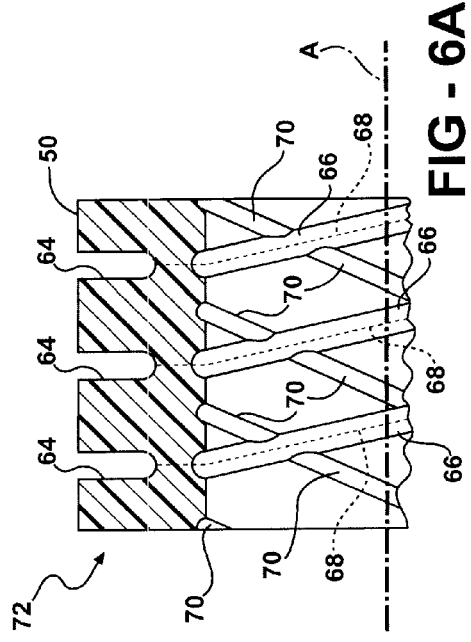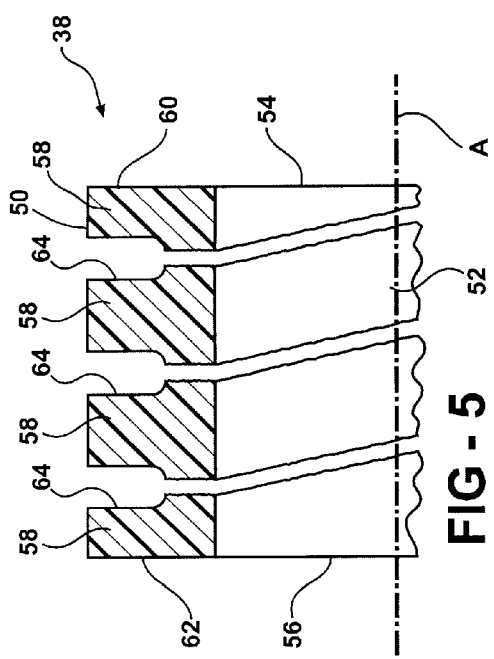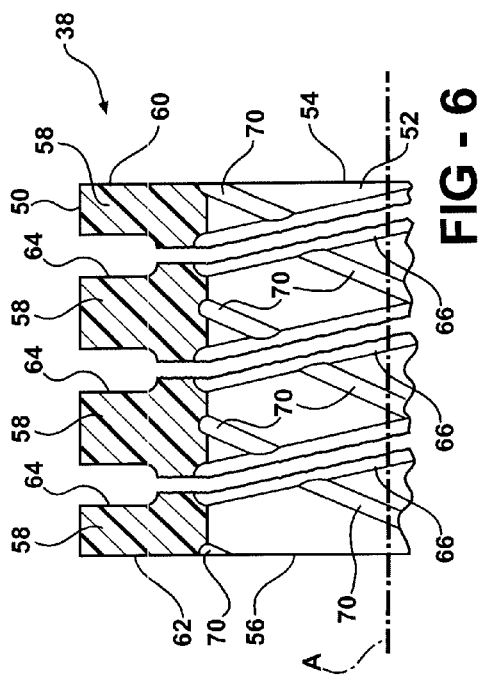

ures and a low coefficient of friction. However, PTFE has comparatively low wear and abrasion resistance and is costly, limiting its use to only certain sealing applications or requiring extra measures to protect the PTFE from damage from the environment.

SEAL ASSEMBLY AND METHOD OF MANUFACTURING THE SAME

This application claims priority to and is a Divisional application of U.S. application Ser. No. 10/920,689, filed Aug. 18, 2004 now U.S. Pat. No. 7,419,165, and is incorporated herein by reference.

FIELD OF THE INVENTION

The present invention relates generally to seal assemblies used to provide a dynamic fluid seal between a housing and a shaft having an outer running surface rotating relative to the housing. More specifically, the present invention relates to sealing elements used in such seal assemblies, including the materials and shapes used to form such sealing elements, and the method for manufacturing such sealing elements.

BACKGROUND OF THE INVENTION

Seal assemblies are well known for providing a dynamic fluid seal between a housing having a bore and a shaft having an outer running surface protruding through the bore and rotating relative to the housing. Such seal assemblies typically comprise a rigid carrier for supporting the seal assembly in the bore. A mounting collar formed from rubber is often molded about the rigid carrier to provide a press-fit connection between the seal assembly and the housing thereby aligning the seal assembly within the bore about the outer running surface. The rigid carrier supports a sealing element, e.g., a lip seal, encircling and dynamically sealing the outer running surface of the shaft.

The sealing element, e.g., the lip seal, is often formed from polytetrafluoroethylene (PTFE) because PTFE offers superior thermal and chemical resistance and a low coefficient of friction. However, PTFE has comparatively low wear and abrasion resistance and is costly, limiting its use to only certain sealing applications or requiring extra measures to protect the PTFE from damage from the environment.

It is an object of the present invention to provide a seal assembly which overcomes or minimizes the drawbacks to typical PTFE seals, while preserving their advantages.

BRIEF SUMMARY OF THE INVENTION AND ADVANTAGES

A seal assembly constructed according to a first aspect of the invention is operative to provide a dynamic fluid seal between a housing having a bore and a shaft having an outer running surface rotating within the bore. The outer running surface rotates about an operational axis relative to the housing. The seal assembly includes a rigid carrier for supporting the seal assembly within the bore of the housing and about the outer running surface. A flexible member of elastomeric material is mounted to the rigid carrier. The flexible member flexibly retains a sealing element in sealing relation with the outer running surface as the outer running surface rotates about the operational axis. The sealing element is formed from a non-polytetrafluoroethylene (non-PTFE) bearing grade plastic material. The non-PTFE material has a hardness that is relatively greater than a hardness of the elastomeric material of the flexible member.

One advantage of this seal assembly is the ability to use non-PTFE bearing grade plastic material for the sealing element. This provides a substantial cost savings over traditional materials such as PTFE, while providing a higher wear and abrasion resistant material suitable for dynamic fluid sealing. Traditionally, such materials have not been used for sealing elements given the rigid nature of such materials, i.e., as the shaft becomes misaligned in the bore the sealing element wears unevenly thus deteriorating the sealing relation with the shaft. With the seal assembly of the present invention, the flexible member is able to flex as the shaft becomes misaligned in the bore. Thus, the sealing element, which is retained by the flexible member, can be less flexible, since the sealing element moves with the flexible member.

In another aspect of the present invention, the sealing element extends in a plurality of helically wound convolutions about the outer running surface. The convolutions provide a hydrodynamic effect which acts as a pump to redirect any fluid that finds its way under the seal back toward the interior ("oil side") of the seal. The convolutions can be single or multiple start thread form, and can be uni or bi-directional, if desired.

The present invention further provides a method of manufacturing a seal assembly with the plurality of helically wound convolutions. The method includes forming a groove extending helically within a surface of a stock piece of sealing material to define a fracture line within the stock piece. The stock piece is then fractured along the fracture line to form the sealing element. By forming the groove to define the fracture line, the method of manufacturing the seal assembly provides a simple and cost effective procedure for forming the sealing element with the plurality of convolutions.

BRIEF DESCRIPTION OF THE SEVERAL VIEWS OF THE DRAWINGS

These advantages and features of the present invention will be readily appreciated as the same becomes better understood by reference to the following detailed description when considered in connection with the accompanying drawings wherein:

FIG. 5 is a fragmentary cross-sectional view of the sealing element of the seal assembly according to an alternative embodiment of the present invention;

FIG. 5A is a fragmentary cross-sectional view of a cylindrical stock piece of non-PTFE material used to form the sealing element shown in FIG. 5;

FIG. 6 is a fragmentary cross-sectional view of the sealing element of the seal assembly according to an alternative embodiment of the present invention; and FIG. 6A is a fragmentary cross-sectional view of a cylindrical stock piece of non-PTFE material used to form the sealing element shown in FIG. 6.

DETAILED DESCRIPTION OF THE INVENTION

Referring to the Figures, wherein like numerals indicate like or corresponding parts throughout the several views, a seal assembly of the present invention is generally shown at 10. The seal assembly 10 is well suited for a multitude of applications in which a dynamic fluid seal is required. Such applications may include automotive and industrial applications. The seal assembly 10 is illustrated herein for use in a shaft seal system 11.

Figure 1:
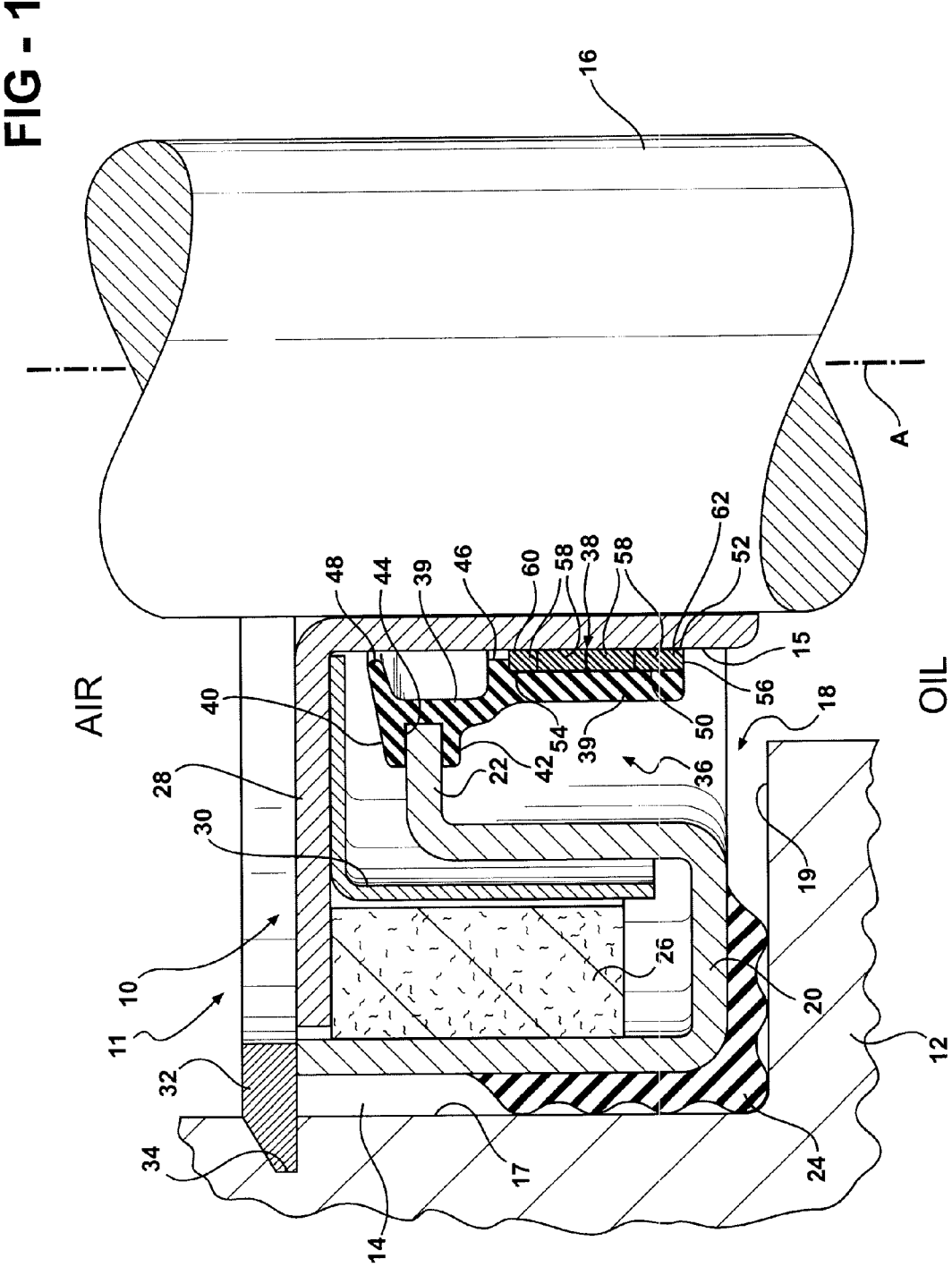
FIG. 1 is a fragmentary cross-sectional view of a seal assembly according to the present invention.

With reference to FIG. 1, the shaft seal system 11 uses the seal assembly 10 to provide a dynamic fluid seal between a housing 12 having a bore 14 and a shaft 16 having an outer running surface 15 rotating within the bore 14. The outer running surface 15 rotates about an operational axis A relative to the housing 12. In FIG. 1, the outer running surface 15 is presented by an annular wear sleeve 28 that is press fit to the shaft 16. The wear sleeve 28 is press fitted to the shaft 16 for purposes well-known to those skilled in the art, such as to provide a manufactured running surface. As will also be appreciated by those skilled in the art, the present invention could be practiced without the wear sleeve 28. The wear sleeve 28 rotates with the shaft 16 in the bore 14. The bore 14 of the housing 12 is formed with a cylindrical stepped bore wall 17 disposed about the shaft 16 and an annular axially facing shoulder 19 disposed transverse to the bore wall 17.

A carrier 18 supports the seal assembly 10 in the bore 14. The carrier 18 includes a U-shaped base portion 20 and an annular flange 22 extending radially inwardly from an end of the base portion 20. The carrier 18 is preferably formed from a rigid material such as metal. An elastomeric mounting collar 24 is formed annularly about the rigid carrier 18 to press fit the seal assembly 10 into the bore 14 thereby providing a barrier to retain the fluid within the housing 12. The elastomeric mounting collar 24 presses against the bore wall 17 and the shoulder 19 to provide the press fit. A retainer ring 32 may be seated within a similarly shaped pocket 34 in the housing 12 to secure the seal assembly 10 within the bore 14.

An annular baffle 30 may be fixed to the wear sleeve 28 and positioned within an annular chamber defined by the U-shaped base portion 20 of the rigid carrier 18 to define a labyrinth path for inhibiting the ingress of dirt and debris into the seal. A filter 26 may be disposed within the labyrinth and mounted to the carrier 20 or wear sleeve 28, if desired, to further assist in entrapping the dirt and debris. When the filter 26 is mounted to the carrier 20, the wear sleeve 28 and annular baffle 30 rotate relative to the filter 26 as the shaft 16 rotates about the operational axis A.

A flexible member 36 of elastomeric material is mounted to and suspended from the rigid carrier 18. The elastomeric material has a hardness of such a magnitude that the flexible member 36 is capable of flexure during use, while maintaining shape, e.g., a Shore A hardness of 25-75 or a Shore D hardness of less than 50. The elastomeric material may include rubber or other like materials.

The flexible member 36 includes a longitudinal portion 39 lying generally parallel to the operational axis A. First 40 and second 42 annular lips project radially outwardly from the longitudinal portion 39 to define a notch 44 therebetween for receiving the annular flange 22 of the rigid carrier 18. This sealably secures the flexible member 36 to the annular flange 22. The flexible member 36 also includes third 46 and fourth 48 lips projecting radially inwardly from the longitudinal portion 39. A gap may be maintained between each of the third 46 and fourth 48 lips and the outer running surface 15.

The flexible member 36 flexibly retains a radially acting sealing element 38 about the outer running surface 15. In the preferred embodiment, the flexible member 36 is molded to the sealing element 38. The flexible member 36 acts as an annular hinge 36 between the annular flange 22 of the rigid carrier 18 and the sealing element 38. The sealing element 38 includes an exterior surface 50 in frictional molded contact with the flexible member 36 to retain the sealing element 38 against the flexible member 36. In other embodiments, the exterior surface 50 is chemically bonded to the flexible member 36. The sealing element 38 further includes a radially inner annular sealing surface 52 extending axially along the outer running surface 15 in sealing relation therewith. At the same time, the third lip 46 of the flexible member 36 abuts the sealing element 38 to retain the sealing element 38 from moving axially in one direction.

Figure 2:
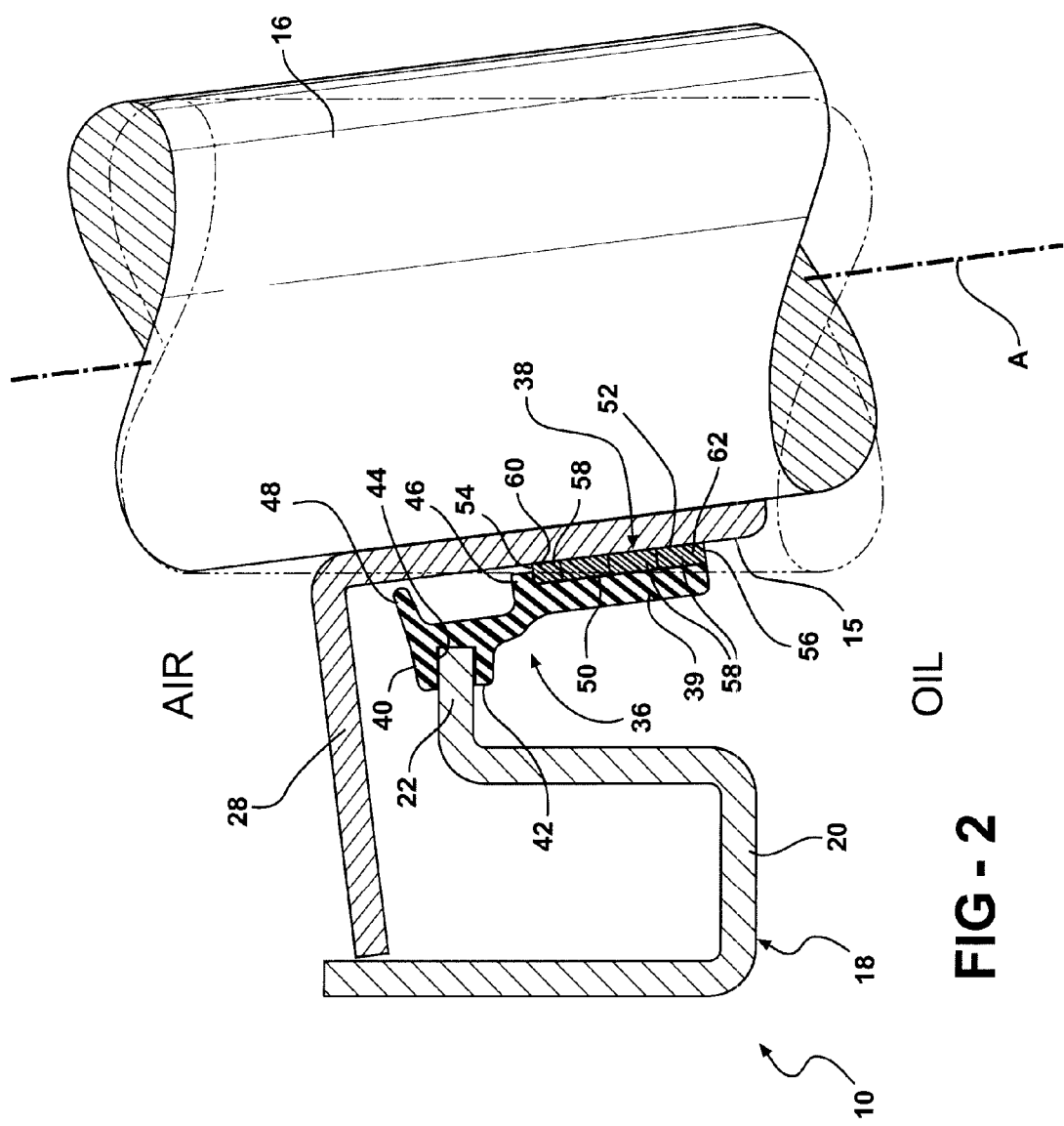
FIG. 2 is a fragmentary cross-sectional view of the seal assembly illustrating misalignment of a shaft rotating about an operational axis.

Referring to FIG. 2, the sealing element 38 moves with the flexible member 36 as the flexible member 36 flexes relative to the rigid carrier 18 when the shaft 16 becomes radially misaligned (shown greatly exaggerated) relative to the rigid carrier 18. At the same time, the radially inner annular sealing surface 52 maintains the sealing relation with the outer running surface 15. Thus, the flexible member 36 acts as a flexible extension of the sealing element 38 allowing the radially inner annular sealing surface 52 to maintain the sealing relation with the outer running surface 15 even when the shaft 16 experiences a runout condition or other misalignment condition within the bore 14.

The sealing element 38 is formed from a non-polytetrafluoroethylene (non-PTFE) bearing grade plastic material. It should be appreciated that the non-PTFE material may contain some PTFE filler, but at levels of less than fifty percent by weight or volume. The non-PTFE material is preferably a thermoplastic material having a hardness relatively greater than the hardness of the elastomeric material forming the flexible member 36. Hence, the sealing element 38 is more rigid than the flexible member 36. The non-PTFE material exhibits a tensile strength greater than five thousand pounds per square inch and a compressive strength greater than five thousand pounds per square inch (using ASTM D638 to measure tensile strength and ASTM D695 to measure compressive strength). Additionally, the non-PTFE material has a wear factor "k" of less than $200 \times 10^{-10}$ in.$^3$-min/ft.lbs.hr.

The non-PTFE material used to form the sealing element 38 may include any imidized, semi-crystalline, or amorphous bearing grade thermoplastics such as nylon, acetal, polyethylene terepthalate (PET-P), polyetheretherketone (PEEK), polyphenylene sulfide (PPS), polyamideimide (PAI), or any other materials having similar properties to those listed. Table 1 below illustrates how these materials compare to PTFE in terms of tensile strength, compressive strength, and wear resistance.

TABLE 1

| Material | Tensile Strength* (psi) | Compressive Strength* (psi) | Wear Factor* "k" × 10⁻¹⁰ (in.³-min/ft.lbs.hr) |
|---|---|---|---|
| Nylon 6/6M | 12500 | 12000 | 90 |
| Nylon 6 Cast | 13000 | 15000 | 80 |
| Acetal | 10000 | 18000 | 30 |
| PET-P | 12000 | 12500 | 60 |
| PEEK | 11000 | 26700 | 100 |
| PPS | 10900 | 18000 | 85 |
| PAI | 12000 | 22000 | 10 |
| PTFE | 3500 | 2000 | 600 |

*Sample measurements based on industry accepted testing methods.

Figure 3:
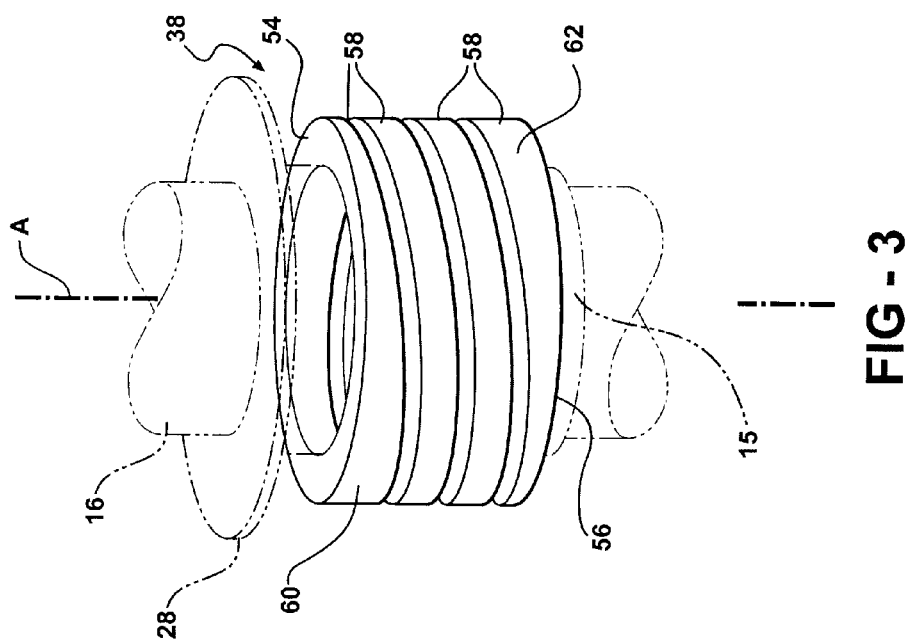
FIG. 3 is a perspective view of a sealing element of the seal assembly.

Referring to FIG. 3, the sealing element 38 extends in a plurality of helically wound convolutions 58 between first 54 and second 56 ends thereof. Thus, the sealing element 38 is in the shape of a cylindrical spiral. Referring back to FIG. 1, the flexible member 36 biases each of the plurality of convolutions 58 into sealing relation with the outer running surface 15 to provide the dynamic fluid seal.

Figure 4:
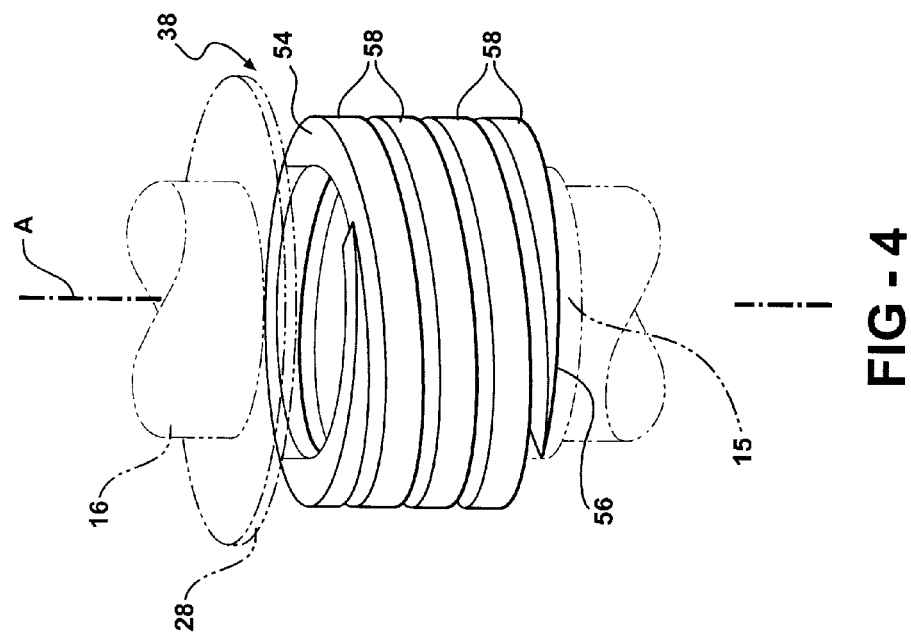
FIG. 4 is a perspective view of an alternative sealing element of the seal assembly.

The plurality of convolutions 58 comprise a continuous strand of the non-PTFE material coiled or wrapped about the outer running surface 15. Each of the plurality of convolutions 58 are movable axially relative to one another such that the sealing element 38 can axially expand and contract along the outer running surface 15 as the outer running surface 15 rotates about the operational axis A. In the illustrations of FIGS. 3 and 4, the sealing element 38 is shown expanded axially along the outer running surface 15.

In the preferred embodiment of FIG. 3, the sealing element 38 includes tapered concentric rings 60, 62 that fully encircle the outer running surface 15 at each of the first 54 and second 56 ends. In this embodiment, the sealing element 38 extends in the helical shape between the concentric rings 60, 62. This yields a slinky-like shape for the sealing element 38. In an alternative embodiment of FIG. 4, the concentric rings 60, 62 are removed and the entire sealing element 38 extends in the helical shape between the ends 54, 56 to yield a wound coil-like shape about the outer running surface 15.

Referring to FIG. 5, in another alternative embodiment of the sealing element 38, the exterior surface 50 of the sealing element 38 defines an exterior groove 64 therein. The exterior groove 64 extends in a helical shape between the first 54 and second 56 ends of the sealing element 38. Likewise, in a further alternative embodiment shown in FIG. 6, the radially inner annular sealing surface 52 of the sealing element 38 defines a first interior groove 66 therein. The interior groove 66 extends in a helical shape between the first 54 and second 56 ends of the sealing element 38. A second interior groove 70 is also defined in the radially inner annular sealing surface 52 transverse to the first interior groove 66. The interior grooves 66, 70 are intended to provide a hydrodynamic function to the sealing element 38 to further retain the fluid within the housing 12. Of course, additional grooves (not shown) or other hydrodynamic features (not shown) well known to those skilled in the art could be formed in the radially inner annular sealing surface 52. While FIGS. 5 and 6 seemingly illustrate multiple exterior 64 and interior 66, 70 grooves, it should be understood that multiple numerals have been used for convenience and only one exterior groove 64 is actually illustrated in FIG. 5 and only one exterior groove 64 and two interior grooves 66, 70 are actually illustrated in FIG. 6. This is due to the helical nature of the grooves 64, 66, 70.

Referring to FIGS. 5A and 6A, a method of manufacturing the seal assembly 10 is also provided by the present invention. The method includes forming the exterior 64 and/or first interior 66 grooves of the sealing element 38 within a stock cylindrical piece 72 of the non-PTFE material to define a helical fracture line 68 within the piece 72. The grooves 64, 66 can be molded or machined into the piece 72, given the properties of the non-PTFE material. The flexible member 36 is preferably molded or bonded onto the piece 72 after forming the grooves 64 and/or 66. The flexible member 36 is then fixed by way of the annular lips 40, 42 onto the annular flange 22 of the rigid carrier 18.

Once the flexible member 36 and the piece 72 are secured to the rigid carrier 18, the piece 72 is fractured along the fracture line 68 to form the sealing element 38, as shown in FIGS. 5 and/or 6. This is preferably accomplished by forming the piece 72 with a slightly smaller diameter than the outer running surface 15 such that as the piece 72 is fitted onto the outer running surface 15, the piece 72 fractures along the fracture line 68. Such a procedure may require special tooling. In addition, when fitted onto the outer running surface 15, the sealing element 38 uncoils, i.e., the plurality of convolutions 58 are expanded about the outer running surface 15. This uncoiling stretches the bonded flexible member 36 torsionally, thus providing an additional loading function to the sealing relation between the sealing element 38 and the outer running surface 15. In effect, each of the plurality of convolutions 58 will operate independently in sealing against the outer running surface 15. The plurality of convolutions 58 provide a hydrodynamic effect which acts as a pump to redirect any fluid that finds its way under the seal back toward the interior ("oil side") of the seal. The plurality of convolutions 58 can be single or multiple start thread form, and can be uni or bi-directional, if desired.

Obviously, many modifications and variations of the present invention are possible in light of the above teachings. The invention may be practiced otherwise than as specifically described within the scope of the appended claims. It should also be appreciated that fragmentary cross-sectional views are utilized to illustrate the seal assembly 10 in accordance with standard drawing convention. Hence, each component of the seal assembly 10 extends annularly about the outer running surface 15 although not explicitly shown in the several views.

What is claimed is:

1. A method of manufacturing a seal assembly having a rigid carrier, a flexible member of elastomeric material mounted to the rigid carrier, and a sealing element retained by the flexible member and formed from a stock piece of sealing material to provide a dynamic fluid seal between a housing having a bore and a shaft having an outer running surface rotating within the bore about an operational axis relative to the housing, said method comprising the steps of:

forming a groove extending helically within a surface of the stock piece of sealing material to define a fracture line within the stock piece of sealing material; and fracturing the stock piece of sealing material along the fracture line after the groove is formed to form the sealing element with a plurality of helically wound convolutions for sealing about the outer running surface of the shaft to provide the dynamic fluid seal.

2. The method as set forth in claim 1 including molding the flexible member onto the stock piece of sealing material after forming the groove.

3. The method as set forth in claim 2 including securing the flexible member to the rigid carrier after the flexible member is molded onto the stock piece of sealing material.

4. The method as set forth in claim 1 wherein forming the groove extending helically within the surface of the stock piece of sealing material is further defined as molding the groove extending helically within the surface.

5. The method as set forth in claim 4 including molding a groove extending helically on a second surface of the stock piece of sealing material opposite the other surface to further define the fracture line.

6. The method as set forth in claim 1 wherein forming the groove extending helically within the surface of the stock piece of sealing material is further defined as machining the groove extending helically within the surface.

7. The method as set forth in claim 6 including machining a groove extending helically on a second surface of the stock piece of sealing material opposite the other surface to further define the fracture line.

* * * * *